(12) United States Patent
Yang et al.

(10) Patent No.: US 12,402,579 B2
(45) Date of Patent: Sep. 2, 2025

(54) CROP IRRIGATION METHOD AND APPARATUS BASED ON SALT LEACHING FRACTION, DEVICE AND STORAGE MEDIUM

(71) Applicant: Guangzhou Institute of Geography, Guangdong Academy of Sciences, Guangzhou (CN)

(72) Inventors: Ting Yang, Guangzhou (CN); Xin Lan, Guangzhou (CN); Junxiang Huang, Guangzhou (CN)

(73) Assignee: Guangzhou Institute of Geography, Guangdong Academy of Sciences, Guangzhou (CN)

( * ) Notice: Subject to any disclaimer, the term of this patent is extended or adjusted under 35 U.S.C. 154(b) by 557 days.

(21) Appl. No.: 17/813,752

(22) Filed: Jul. 20, 2022

(65) Prior Publication Data

US 2023/0276754 A1    Sep. 7, 2023

(30) Foreign Application Priority Data

Mar. 7, 2022   (CN) .......................... 202210225339.6

(51) Int. Cl.
*A01G 25/16*    (2006.01)
*A01G 25/02*    (2006.01)
*G06Q 50/02*    (2024.01)

(52) U.S. Cl.
CPC .............. *A01G 25/16* (2013.01); *A01G 25/02* (2013.01); *G06Q 50/02* (2013.01)

(58) Field of Classification Search
CPC ........ A01G 25/00; A01G 25/02; A01G 25/16; G06Q 50/02; Y02A 40/10
See application file for complete search history.

(56) References Cited

U.S. PATENT DOCUMENTS 7,063,270 B2 *  6/2006  Bowers ............... A01G 25/167
                                                      137/78.3
8,744,772 B1 *  6/2014  Magro .................. G01N 33/24
                                                       702/22

(Continued)

FOREIGN PATENT DOCUMENTS

CN        102160480 A       8/2011
CN        103477948 A       1/2014

(Continued)

OTHER PUBLICATIONS

First Office Action for application CN 202210225339.6, dated Dec. 29, 2022. China National Intellectual Property Administration, Beijing, China.

(Continued)

*Primary Examiner* — Scott T Baderman
*Assistant Examiner* — Mario M Velez-Lopez
(74) *Attorney, Agent, or Firm* — M&B IP Analysts, LLC

(57) ABSTRACT

A crop irrigation method based on a salt leaching fraction disclosed. The method includes: calculating a salt leaching fraction of crops by combining a salt stress and effect of water quality on an irrigation amount of the crops, controlling an irrigation apparatus to perform irrigation and drainage operations by monitoring water and salt in a soil depth corresponding to crop roots, and removing excess salt from the crop roots, thus reducing the salt stress on crop growth, ensuring a crop yield, and reducing waste of water resources while realizing efficient utilization of existing water resources.

17 Claims, 4 Drawing Sheets

(56) References Cited

U.S. PATENT DOCUMENTS

2012/0084115 A1* 4/2012 Cline .................... A01G 25/16
                                                     705/7.27
2016/0219806 A1* 8/2016 Thiessen ................ G05B 15/02

FOREIGN PATENT DOCUMENTS

| CN | 102726273 B | * | 2/2014 | |
|----|-------------|---|--------|--|
| CN | 104221665 A | | 12/2014 | |
| CN | 109813865 A | | 5/2019 | |
| CN | 110197437 A | * | 9/2019 | |
| CN | 111280019 A | | 6/2020 | |
| CN | 112602563 A | | 4/2021 | |
| WO | WO-2013012826 A1 | * | 1/2013 | ........... A01G 25/092 |

OTHER PUBLICATIONS

First Search for application CN 202210225339.6, dated Dec. 29, 2022. China National Intellectual Property Administration, Beijing, China.

Ma, et al., Irrigating strategy and leaching discipline of slightly saline water in North China Plain. Journal of Arid Land Resources and Environment, vol. 25, No. 4, Apr. 2011. (Year: 2011).

* cited by examiner

CROP IRRIGATION METHOD AND APPARATUS BASED ON SALT LEACHING FRACTION, DEVICE AND STORAGE MEDIUM

CROSS-REFERENCE TO RELATED APPLICATION

This application is based on and claims the benefit of priority from Chinese Patent Application No. 2022102253396, filed on 7 Mar. 2022, the entirety of which is incorporated by reference herein.

TECHNICAL FIELD

The disclosure relates to the technical field of irrigation, and more particularly, to a crop irrigation method and apparatus based on a salt leaching fraction, a device and a storage medium.

BACKGROUND

Most arid and semi-arid areas in China are faced with serious phenomena such as shortage of water resources, salts accumulation around rootzone area, unreasonable utilization of water resources and water pollution. However, current irrigation methods mainly rely on manual work, and manual control often has the characteristics of strong subjectivity, large control error and high labor cost, leading to the decline of irrigation quality, the increase of irrigation cost and the waste of water resources. Therefore, it is very important to make rational use of existing water resources for efficient irrigation, ensure the yield and reduce the waste of water resources.

SUMMARY

On this basis, the disclosure aims to provide a crop irrigation method and apparatus based on a salt leaching fraction, a device and a storage medium. The method includes, calculating a salt leaching fraction of crops by combining a salt stress and effect of water quality on an irrigation amount of the crops, controlling an irrigation apparatus to perform irrigation and drainage operations by monitoring water and salt in a soil depth corresponding to crop roots, and removing excess salt from the crop roots, thus reducing the salt stress on crop growth, ensuring a crop yield, and reducing waste of water resources while realizing efficient utilization of existing water resources.

In a first aspect, an embodiment of the disclosure provides a crop irrigation method based on a salt leaching fraction, which includes:
  acquiring information data of crops in a target area, where the information data includes location information data, root range data and a salt tolerance threshold;
  inputting the location information data and the root range data into a preset numerical model of soil fluid to acquire a simulated soil salt content in the target area;
  acquiring a salt leaching fraction of the crops in the target area according to the salt tolerance threshold of the crops, the simulated soil salt content and a calculating algorithm of the salt leaching fraction;
  acquiring a water demand of the crops in the target area, acquiring an irrigation amount of the crops in the target area according to the water demand of the crops in the target area, the salt leaching fraction and a calculating algorithm of the irrigation amount, generating a water storage instruction according to the irrigation amount of the crops in the target area, and sending the water storage instruction to an irrigation apparatus; and
  acquiring a real soil water content and a real soil salt content associated with the root range data of the crops, and controlling the irrigation apparatus to perform irrigation and drainage operations according to the real soil water content, the real soil salt content and preset demand thresholds of all growth periods of the crops, where the demand thresholds include a water demand threshold and a salt demand threshold.

In a second aspect, an embodiment of the disclosure provides a crop irrigation apparatus based on a salt leaching fraction, which includes:
  an acquisition module configured for acquiring information data of crops in a target area, where the information data includes location information data, root range data and a salt tolerance threshold;
  a soil salt content calculation module configured for inputting the location information data and the root range data into a preset numerical model of soil fluid to acquire a simulated soil salt content in the target area;
  a salt leaching fraction calculation module configured for acquiring a salt leaching fraction of the crops in the target area according to the salt tolerance threshold of the crops, the simulated soil salt content and a calculating algorithm of the salt leaching fraction;
  an irrigation amount calculation module configured for acquiring a water demand of the crops in the target area, acquiring an irrigation amount of the crops in the target area according to the water demand of the crops in the target area, the salt leaching fraction and a calculating algorithm of the irrigation amount, generating a water storage instruction according to the irrigation amount of the crops in the target area, and sending the water storage instruction to an irrigation apparatus; and
  an execution module configured for acquiring a real soil water content and a real soil salt content associated with the root range data of the crops, and controlling the irrigation apparatus to perform irrigation and drainage operations according to the real soil water content, the real soil salt content and preset demand thresholds of all growth periods of the crops, where the demand thresholds include a water demand threshold and a salt demand threshold.

In a third aspect, an embodiment of the disclosure provides a computer device, which includes a processor, a memory storing a computer program which, when executed by the processor, causes the processor to perform a crop irrigation method based on a salt leaching fraction in the first aspect.

In a fourth aspect, an embodiment of the disclosure provides a non-transitory storage medium storing a computer program which, when executed by a processor, causes the processor to perform a crop irrigation method based on a salt leaching fraction in the first aspect.

The embodiments of the disclosure provide the crop irrigation method and apparatus based on a salt leaching fraction, the device and the storage medium. The method includes, calculating the salt leaching fraction of the crops by combining the salt stress and the effect of the water quality on the irrigation amount of the crops, controlling the irrigation apparatus to perform the irrigation and drainage operations by monitoring the water and salt in the soil depth corresponding to the crop roots, and removing excess salt from the crop roots, thus reducing the salt stress on the crop growth, ensuring the crop yield, and reducing the waste of water resources while realizing the efficient utilization of existing water resources.

For better understanding and implementation, the disclosure is described in detail hereinafter with reference to the drawings.

DETAILED DESCRIPTION

Exemplary embodiments are described in detail herein, and examples of the exemplary embodiments are shown in the accompanying drawings. When the following description involves the accompanying drawings, unless otherwise indicated, the same numeral in different accompanying drawings represent the same or similar elements. The implementations described in the following exemplary embodiments do not represent all implementations that are consistent with this application. On the contrary, the implementations are merely examples of devices and methods that are described in detail in the appended claims and that are consistent with some aspects of this application.

The terms used in this application are for the purpose of describing specific embodiments only and are not intended to limit this application. The singular forms of "a" and "the" used in this application and the appended claims are intended to include the plural forms as well, unless the context clearly indicates otherwise. It should be further understood that the term "and/or" used herein indicates and includes any or all possible combinations of one or more associated listed items.

It should be understood that although the terms such as "first," "second," and "third," may be used in this application to describe various information, the information should not be limited to these terms. These terms are merely used to distinguish between information of the same type. For example, without departing from the scope of this application, first information may also be referred to as second information, and similarly, second information may also be referred to as first information. Depending on the context, for example, the term "if"/"in case" used herein may be interpreted as "while" or "when," or "in response to determination".

Figure 1:
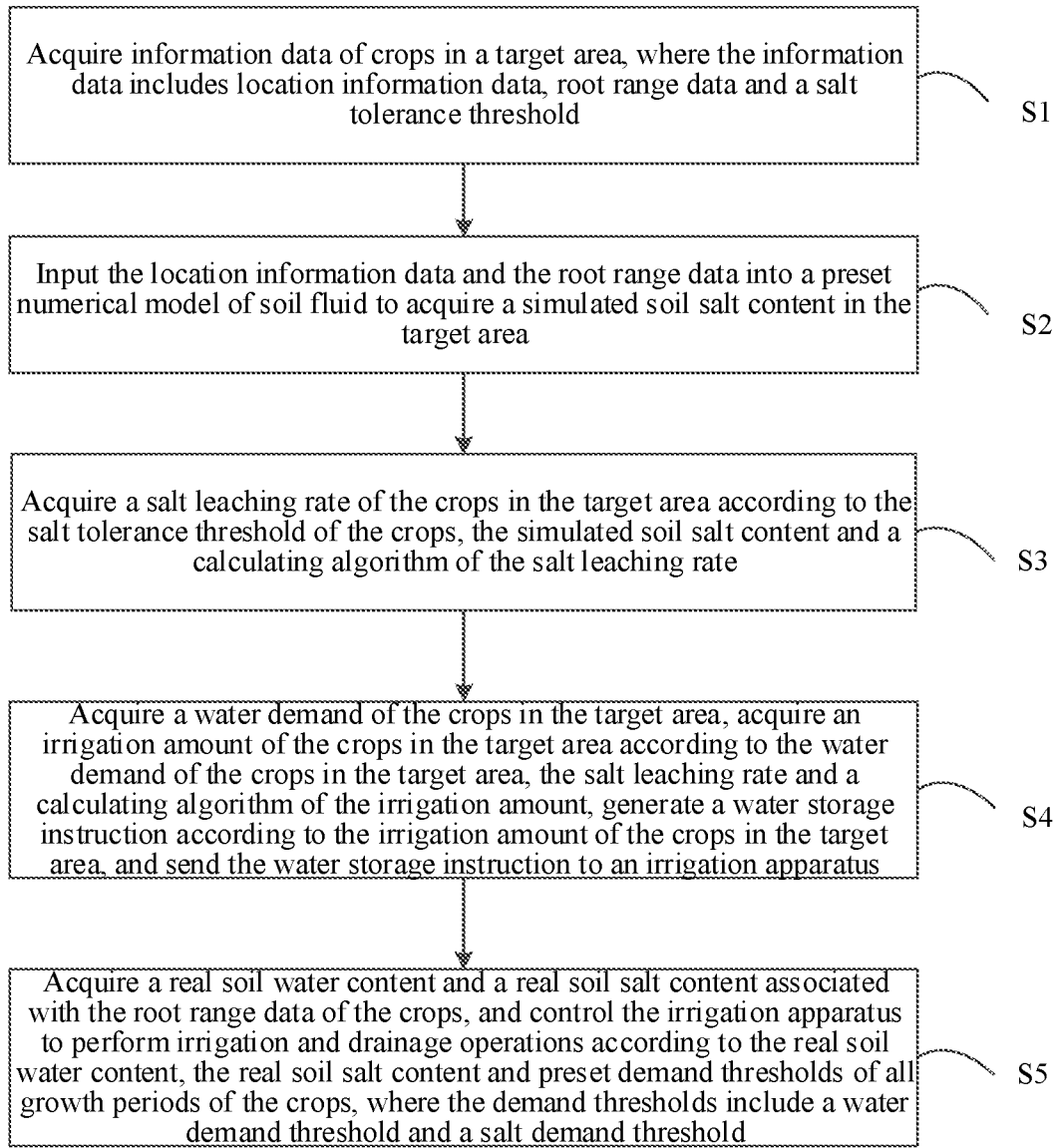
FIG. 1 is a flow chart of a crop irrigation method based on a salt leaching fraction provided by an embodiment of the disclosure.

With reference to FIG. 1, FIG. 1 is a flow chart of a crop irrigation method based on a salt leaching fraction provided by an embodiment of the disclosure. The method includes the following steps.

In S1, information data of crops in a target area is acquired, where the information data includes location information data, root range data and a salt tolerance threshold.

An executive body of the crop irrigation method based on a salt leaching fraction is an irrigation device of the crop irrigation method based on a salt leaching fraction (hereinafter referred to as irrigation device). In an optional embodiment, the irrigation device may be a computer device, a server or a server farm formed by combining a plurality of computer devices.

In an embodiment, the irrigation device may acquire the information data of the crops in the target area input by a user, or acquire the information data of the crops in the target area from a preset database, where the information data includes location information data, root range data and a salt tolerance threshold.

The location information data refers to locations of the crops in the target area, including plane coordinate data x and longitudinal coordinate data z.

The root range data refers to extension ranges of the roots in soil when the crops are planted in the soil in the target area, including maximum rooting depth $Z_m$ and largest root radius data $X_m$.

The salt tolerance threshold is used for reflecting a salt tolerance of the crops. In an optional embodiment, a salt tolerance threshold of crops such as fruits and vegetables is set as 2.5; a salt tolerance threshold of crops such as leafy vegetables is set as 2.0; and a salt tolerance threshold of crops such as round plants is set as 1.8; and a salt tolerance threshold of crops such as potted plants is set as 1.5.

In S2, the location information data and the root range data are input into a preset numerical model of soil fluid to acquire a simulated soil salt content in the target area.

At present, acquisition of the salt leaching fraction of the crops is still based on a traditional one-dimensional steady-state criterion, which leads to a calculated water demand far greater than an actual water demand of the crops, so that the effect of improving effective utilization rate of saline-alkali soil and water resources is not significant.

In this embodiment, the irrigation device uses HYDRUS-2D as the numerical model of soil fluid, where the HYDRUS-2D is a finite element computer model, and is configured for simulating two-dimensional movements of soil water flow and solute of subsurface drip irrigation. The water flow state of this model is a two-dimensional or axisymmetric three-dimensional isothermal saturated-unsaturated Darcy flow, the influence of air on the movement of the soil water flow is ignored, a modified Richards' equation is used as a water flow control equation, which means that a confluent source term is embedded to consider crop root water absorption. Various water flow boundaries may be flexibly processed through a program, including fixed and variable water head boundaries, a given flow boundary, a seepage boundary, a free drainage boundary, an atmospheric boundary and a drainage ditch. The water flow area itself may have an irregular water flow boundary, and may even be composed of anisotropic heterogeneous soil.

The numerical model of soil fluid includes a water movement algorithm and a salt movement algorithm. The irrigation device inputs the location information data and the root range data into the preset numerical model of soil fluid, and acquires the simulated soil salt content in the target area output by the numerical model of soil fluid according to the water movement algorithm and the salt movement algorithm in the numerical model of soil fluid.

Figure 2:
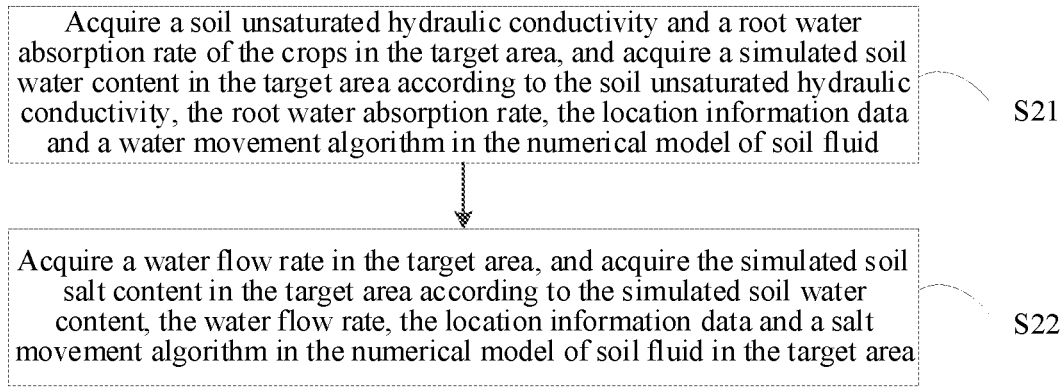
FIG. 2 is a flow chart of S2 in the crop irrigation method based on a salt leaching fraction provided by an embodiment of the disclosure.

With reference to FIG. 2, FIG. 2 is a flow chart of S2 in the crop irrigation method based on a salt leaching fraction provided by an embodiment of the disclosure. S2 includes steps S21 to S22 as follows.

In S21, a soil unsaturated hydraulic conductivity and a root water absorption rate of the crops in the target area are acquired, and a simulated soil water content in the target area is acquired according to the soil unsaturated hydraulic conductivity, the root water absorption rate, the location information data and the water movement algorithm in the numerical model of soil fluid.

The water movement algorithm is:

$$\frac{\partial \theta}{\partial t} = \frac{\partial}{\partial x}\left[K(h)\frac{\partial h}{\partial x}\right] + \frac{\partial}{\partial z}\left[K(th)\frac{\partial h}{\partial z}\right] - \frac{\partial K(h)}{\partial z} - S(h),$$

where $\theta$ is the soil water content, x is plane coordinate data in the location information data, z is longitudinal coordinate data in the location information data, $K(h)$ is the soil unsaturated hydraulic conductivity, and $S(h)$ is the root water absorption rate.

In this embodiment, the irrigation device acquires the soil unsaturated hydraulic conductivity and the root water absorption rate of the crops in the target area, and acquires the simulated soil water content in the target area according to the soil unsaturated hydraulic conductivity, the root water absorption rate, the location information data and the water movement algorithm in the numerical model of soil fluid.

In S22, a water flow rate in the target area is acquired, and the simulated soil salt content in the target area is acquired according to the simulated soil water content, the water flow rate, the location information data and the salt movement algorithm in the numerical model of soil fluid in the target area.

The salt movement algorithm is:

$$\frac{\partial(\theta EC_w)}{\partial t} = \frac{\partial}{\partial x}\left[\theta\lambda\left|\frac{q_w}{\theta}\right|\frac{\partial EC_w}{\partial x}\right] + \frac{\partial}{\partial z}\left[\theta\lambda\left|\frac{q_w}{\theta}\right|\frac{\partial EC_w}{\partial x}\right] - \frac{\partial}{\partial z}(q_w EC_w),$$

where $EC_w$ is the electricity conductivity of soil water, t is a water flow time, $\lambda$ is a preset water flow dispersity, and $q_w$ is the water flow rate.

In this embodiment, the irrigation device acquires the water flow rate in the target area, and acquires the simulated soil salt content in the target area according to the simulated soil water content, the water flow rate, the plane coordinate data x and the longitudinal coordinate data z in the location information data, and the salt movement algorithm in the numerical model of soil fluid in the target area.

Figure 3:
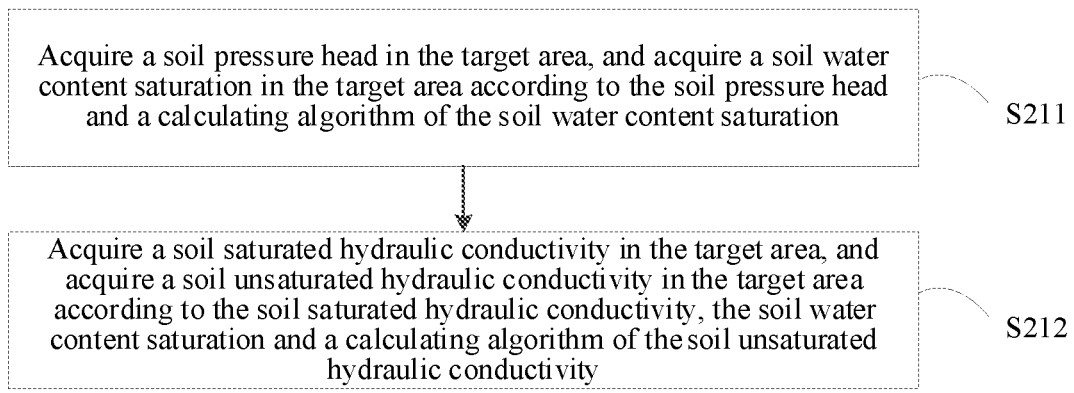
FIG. 3 is a flow chart of S21 in the crop irrigation method based on a salt leaching fraction provided by an embodiment of the disclosure.

With reference to FIG. 3, FIG. 3 is a flow chart of S21 in the crop irrigation method based on a salt leaching fraction provided by an embodiment of the disclosure. S21 includes steps S211 to S212 as follows.

In S211, a soil pressure head in the target area is acquired, and a soil water content saturation in the target area is acquired according to the soil pressure head and a calculating algorithm of the soil water content saturation.

The calculating algorithm of the soil water content saturation is:

$$S_e = \frac{1}{[1+(-a|h|)^n]^m},$$

where $S_e$ is the effective saturation, $\alpha$, n and m are first, second and third empirical values related to the soil porosity, respectively.

In this embodiment, the irrigation device acquires the soil pressure head in the target area, where the soil pressure head refers to pressure potential energy of water per unit mass to soil expressed by a water column height, and acquires the soil water content saturation in the target area according to the soil pressure head and the calculating algorithm of the soil water content saturation.

In S212, a soil saturated hydraulic conductivity in the target area is acquired, and a soil unsaturated hydraulic conductivity in the target area is acquired according to the soil saturated hydraulic conductivity, the soil water content saturation and a calculating algorithm of the soil unsaturated hydraulic conductivity.

The calculating algorithm of the soil unsaturated hydraulic conductivity is:

$$K(h) = K_s S_e^{0.5}[1-(1-S_e^{1/m})^m]^2$$

where $K(h)$ is the soil unsaturated hydraulic conductivity, and $K_s$ is the soil saturated hydraulic conductivity in the target area.

In this embodiment, the irrigation device acquires the soil saturated hydraulic conductivity in the target area, and acquires the soil unsaturated hydraulic conductivity in the target area according to the soil saturated hydraulic conductivity, the soil water content saturation and the calculating algorithm of the soil unsaturated hydraulic conductivity.

Figure 4:
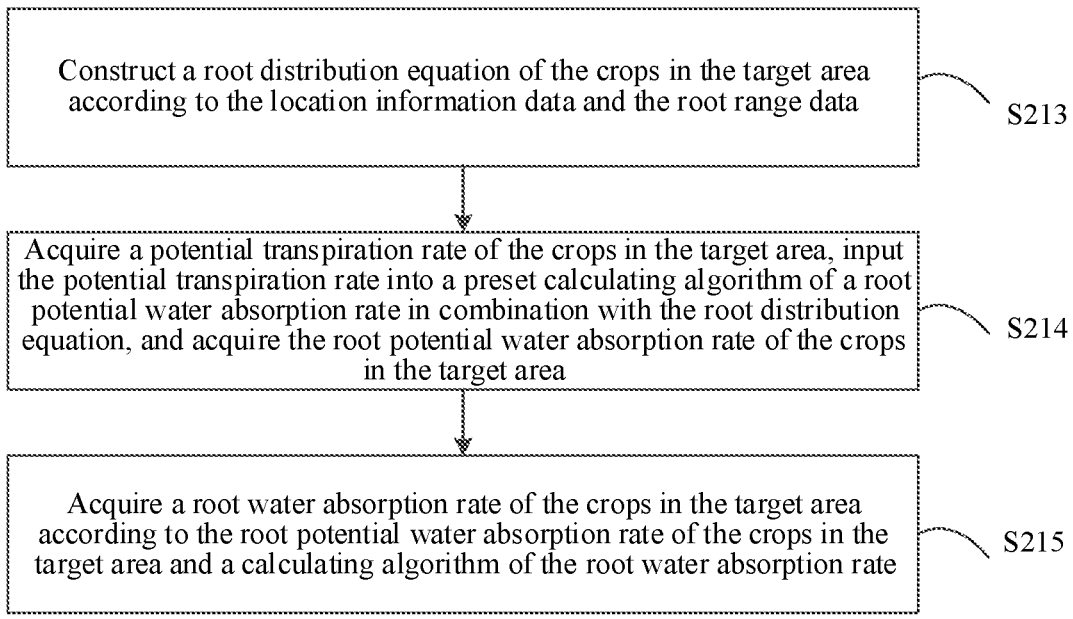
FIG. 4 is a flow chart of S21 in the crop irrigation method based on a salt leaching fraction provided by an embodiment of the disclosure.

With reference to FIG. 4, FIG. 4 is a flow chart of S21 in the crop irrigation method based on a salt leaching fraction provided by an embodiment of the disclosure. S21 further includes steps S213 to S215 as follows.

In S213, a root distribution equation of the crops in the target area is constructed according to the location information data and the root range data.

The root distribution equation is:

$$b(x,z) = \left(1-\frac{z}{Z_m}\right)\left(1-\frac{x}{X_m}\right)e^{-[(p_z/Z_m)|z^*-z|+(p_x/X_m)|x^*-x|]},$$

where $b(x,z)$ is the root distribution equation, $Z_m$ is a maximum rooting depth of the crops in the target area, $X_m$ is a maximum root radius of the crops in the target area, $p_z$ and $z^*$ are first and second empirical values associated with the maximum rooting depth respectively, and $p_x$ and $x^*$ are first and second empirical values associated with the maximum root radius respectively.

In this embodiment, the irrigation device constructs the root distribution equation of the crops in the target area according to the location information data and the root range data.

In S214, a potential transpiration rate of the crops in the target area is acquired, the potential transpiration rate is input into a preset calculating algorithm of a potential root water uptake in combination with the root distribution equation, and the potential root water uptake of the crops in the target area is acquired.

The calculating algorithm of the potential root water uptake is:

$$S_p(x, z) = \frac{X_m b(x, z) T_p}{\int_0^{X_m} \int_0^{Z_m} b(x, z) dx dz},$$

where $S_p(x, z)$ is the potential root water uptake, and $T_p$ is the potential transpiration rate.

In this embodiment, the irrigation device acquires the potential transpiration rate of the crops in the target area, inputs the potential transpiration rate into the preset calculating algorithm of the potential root water uptake in combination with the root distribution equation, and acquires the potential root water uptake of the crops in the target area.

In S215, a root water absorption rate of the crops in the target area is acquired according to the potential root water uptake of the crops in the target area and a calculating algorithm of the root water absorption rate.

The calculating algorithm of the root water absorption rate is:

$$S(h) = \beta(h) S_p,$$

where $\beta(h)$ is a water stress response function, which is a prescribed dimensionless function of the soil water pressure head ($0 < \beta < 1$).

In this embodiment, the irrigation device acquires the root water absorption rate of the crops in the target area according to the potential root water uptake of the crops in the target area and the calculating algorithm of the root water absorption rate.

Figure 5:
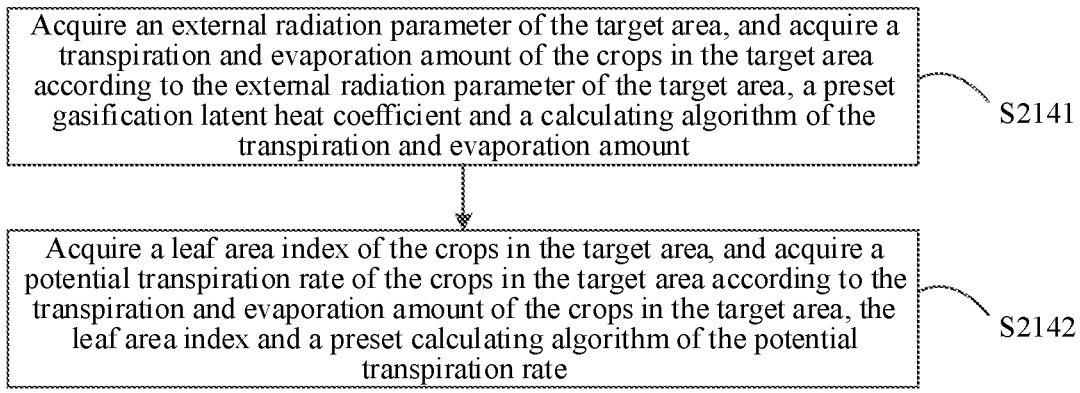
FIG. 5 is a flow chart of S214 in the crop irrigation method based on a salt leaching fraction provided by an embodiment of the disclosure.

With reference to FIG. 5, FIG. 5 is a flow chart of S214 in the crop irrigation method based on a salt leaching fraction provided by an embodiment of the disclosure. S214 includes steps S2141 to S2142 as follows.

In S2141, an external radiation parameter of the target area is acquired, and evapor transpiration of the crops in the target area is acquired according to the external radiation parameter of the target area, a preset latent heat of vaporization and a calculating algorithm of the evapor transpiration.

The external radiation parameter is used for reflecting a radiation amount of the target area, and the irrigation device may measure the external radiation parameter of the target area through a meteorological tower.

The gasification latent heat refers to heat absorbed by a certain liquid substance per unit mass during gasification when a temperature is constant, and specifically refers to heat absorbed by water of the crops during gasification due to transpiration.

The calculating algorithm of the evaportranspiration is:

$$ET_o = \frac{KtRG_o}{\lambda},$$

where $ET_o$ is the reference evaportranspiration, Kt is empirical data of the evaportranspiration, $RG_o$ is the external radiation parameter of the target area, and $\lambda$ is the latent heat of vaporization.

In this embodiment, the irrigation device acquires the external radiation parameter of the target area, and acquires the evaportranspiration of the crops in the target area according to the external radiation parameter of the target area, the preset latent heat of vaporization and the calculating algorithm of the evaportranspiration.

In S2142, a leaf area index of the crops in the target area is acquired, and a potential transpiration rate of the crops in the target area is acquired according to the evaportranspiration of the crops in the target area, the leaf area index and a preset calculating algorithm of the potential transpiration rate.

The leaf area index refers to a multiple of a total area of plant leaves per unit land area to the land area, which is usually measured by a radiation measurement method or an image measurement method, with a commonly configured instrument such as a LAI-2000 plant canopy analyzer.

The calculating algorithm of the potential transpiration rate is:

$$T_p = ET_o(1 - e^{-kLAI})$$

where $T_p$ is the potential transpiration rate, LAI is the leaf area index, and k is a constant governing the radiation extinction by the canopy as a function of sun angle, the distribution of plants, and the arrangement of leaves.

In this embodiment, the irrigation device acquires the leaf area index of the crops in the target area, and acquires the potential transpiration rate of the crops in the target area according to the evapotranspiration of the crops in the target area, the leaf area index and the preset calculating algorithm of the potential transpiration rate.

In S3, a salt leaching fraction of the crops in the target area is acquired according to the salt tolerance threshold of the crops, the simulated soil salt content and a calculating algorithm of the salt leaching fraction.

Considering that agricultural irrigation water is usually brackish water, there is a salt stress on roots in soil due to transpiration and evaporation during crop growth, so that it is necessary to consider influence of the salt leaching fraction required for salt leaching.

In this embodiment, the irrigation device acquires the salt leaching fraction of the crops in the target area according to the salt tolerance threshold of the crops, the simulated soil salt content and the calculating algorithm of the salt leaching fraction. The calculating algorithm of the salt leaching fraction is:

$$LF(t) = \frac{EC_{iw}}{EC_{dw}(t)}$$

where $LF(t)$ is the time variable of salt leaching fraction, $EC_{iw}$ is electricity conductivity of the irrigation water, $EC_{dw}(t)$ is a time variable of soil water electricity conductivity around root zone area.

In S4, a water demand of the crops in the target area is acquired, an irrigation amount of the crops in the target area is acquired according to the water demand of the crops in the target area, the salt leaching fraction and a calculating algorithm of the irrigation amount, a water storage instruction is generated according to the irrigation amount of the crops in the target area, and the water storage instruction is sent to an irrigation apparatus.

In this embodiment, the irrigation device acquires the water demand of the crops in the target area, acquires the irrigation amount of the crops in the target area according to the water demand of the crops in the target area, the salt leaching fraction and the calculating algorithm of the irrigation amount, generates the water storage instruction according to the irrigation amount of the crops in the target area, and sends the water storage instruction to the irrigation apparatus.

Figure 6:
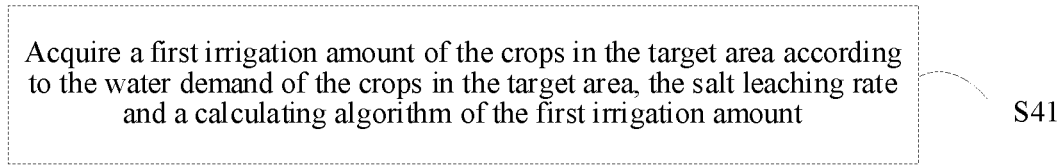
FIG. 6 is a flow chart of S4 in the crop irrigation method based on a salt leaching fraction provided by an embodiment of the disclosure.

With reference to FIG. 6, FIG. 6 is a flow chart of S4 in the crop irrigation method based on a salt leaching fraction provided by an embodiment of the disclosure. S4 includes step S41 as follows.

In S41, a first irrigation amount of the crops in the target area is acquired according to the water demand of the crops in the target area, the salt leaching fraction and a calculating algorithm of the first irrigation amount.

The calculating algorithm of the first irrigation amount is:

$$IR(t) = CWR \times (1 + LF(t))$$

where CWR is the crop water requirement, IR(t) is the first required irrigation amount, and LF(t) is the salt leaching fraction.

In this embodiment, the irrigation device acquires the first irrigation amount of the crops in the target area according to the water demand of the crops in the target area, the salt leaching fraction and the calculating algorithm of the first irrigation amount, and accurately estimates the water demand of the crops by combining the salt stress and the effect of the water quality on the irrigation amount of the crops, thus realizing efficient irrigation by using existing water resources as much as possible, and reducing waste of water resources.

Figure 7:
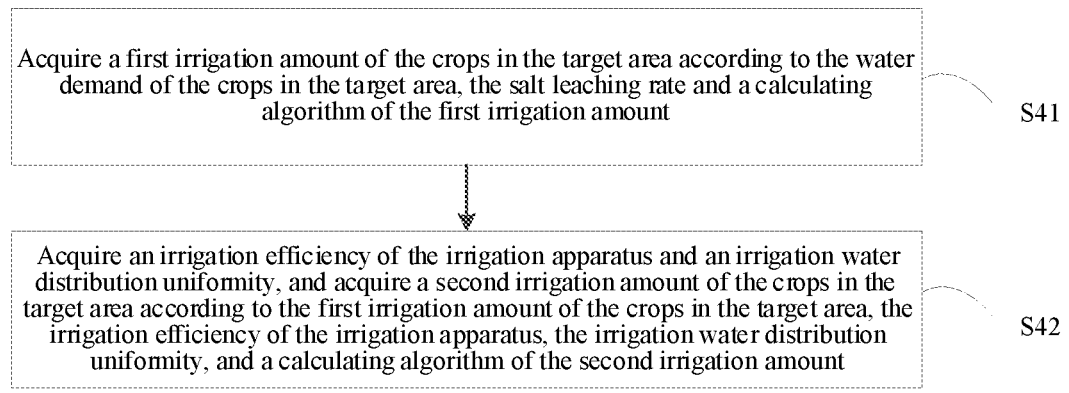
FIG. 7 is a flow chart of S4 in the crop irrigation method based on a salt leaching fraction provided by another embodiment of the disclosure.

With reference to FIG. 7, FIG. 7 is a flow chart of S4 in the crop irrigation method based on a salt leaching fraction provided by another embodiment of the disclosure. S4 further includes step S42 as follows.

In S42, irrigation efficiency of the irrigation apparatus and irrigation water distribution uniformity are acquired, and a second irrigation amount of the crops in the target area is acquired according to the first irrigation amount of the crops in the target area, the irrigation efficiency of the irrigation apparatus, the irrigation water distribution uniformity, and a calculating algorithm of the second irrigation amount.

Since the irrigation water utilization efficiency depends on the irrigation water distribution uniformity and the efficiency of the irrigation apparatus, in an optional embodiment, irrigation modes of the irrigation apparatus include sprinkler irrigation and drip irrigation. When the irrigation mode is the sprinkler irrigation, the irrigation water distribution uniformity may be selected from 0.6 to 0.7, and when the irrigation mode is the drip irrigation, the irrigation water distribution uniformity may be selected from 0.9 to 0.95.

In this embodiment, the irrigation device acquires the irrigation efficiency of the irrigation apparatus and the irrigation water distribution uniformity, and acquires the second irrigation amount of the crops in the target area according to the first irrigation amount of the crops in the target area, the irrigation efficiency of the irrigation apparatus, the irrigation water distribution uniformity, and the calculating algorithm of the second irrigation amount. The calculating algorithm of the second irrigation amount is:

$$IWC = \frac{IR(t) \times (1 + Kl)}{Ki},$$

where IWC is the second required irrigation amount, IR is the first required irrigation amount, Ki is the irrigation efficiency, and Kl is the irrigation water distribution uniformity.

In this embodiment, the irrigation device may generate a first water storage instruction corresponding to the first irrigation amount according to the first irrigation amount of the crops in the target area and send the first water storage instruction to the irrigation apparatus, or generate a second water storage instruction corresponding to the second irrigation amount according to the second irrigation amount of the crops in the target area and send the second water storage instruction to the irrigation apparatus, so as to control the irrigation apparatus to store water.

In S5, a real soil water content and a real soil salt content associated with the root range data of the crops are acquired, and the irrigation apparatus is controlled to perform irrigation and drainage operations according to the real soil water content, the real soil salt content and preset demand thresholds of all growth periods of the crops.

The demand thresholds include a water demand threshold and a salt demand threshold. In order to ensure that all parts of crop roots get a proper amount of water, in this embodiment, the irrigation device acquires the real soil water content and the real soil salt content associated with the root range data of the crops according to the root range data of the crops, and controls the irrigation apparatus to perform irrigation and drainage operations according to the real soil water content data and the preset water demand thresholds of all growth periods of the crops, and the real soil salt content data and the preset salt demand thresholds of all growth periods of the crops respectively.

Specifically, water comparison results are acquired by comparing the real soil water content data with the preset water demand thresholds of all growth periods of the crops, where the water comparison results include results A, B and C. The result A is that the real soil water content data is less than the water demand threshold, the result B is that the real soil water content data is equal to the water demand threshold, and the result C is that the real soil water content data is greater than the water demand threshold.

Salt comparison results are acquired by comparing the real soil salt content data with the preset salt demand thresholds of all growth periods of the crops, where the salt comparison results include results D, E and F. The result D is that the real soil salt content data is less than the salt demand threshold, the result E is that the real soil salt content data is equal to the salt demand threshold, and the result F is that the real soil salt content is greater than the salt demand threshold.

The irrigation device makes judgment according to the water comparison results and the salt comparison results, and controls the irrigation apparatus to perform the irrigation and drainage operations according to a judgment result, which is specifically as follows.

If the judgment result is a case (A and D) or a case (A and E), the irrigation device controls the irrigation apparatus to perform the irrigation operation by calculating a difference between the real soil water content data and the water demand threshold.

If the judgment result is a case (A and F), the irrigation device not only needs to calculate the difference between the real soil water content data and the water demand threshold, but also needs to calculate an amount of water required for leaching excess salt according to the salt leaching fraction, and controls the irrigation apparatus to perform the irrigation and drainage operations according to a total drainage amount and a drainage distribution value, where the total drainage amount is DP=CWR*LF, and the drainage distribution value is drainage data associated with the root range data.

If the judgment result is a case (B and D) or a case (B and E), the irrigation device controls the irrigation apparatus to perform the normal irrigation operation.

If the judgment result is a case (B and F), the irrigation device calculates the amount of water required for leaching excess salt according to the salt leaching rate, and controls the irrigation apparatus to perform the irrigation operation according to the total drainage amount and the drainage distribution value.

If the judgment result is a case (C and D) or a case (C and E) or a case (C and F), the irrigation device controls the irrigation apparatus to perform the drainage operation by calculating the difference between the real soil water content data and the water demand threshold.

Figure 8:
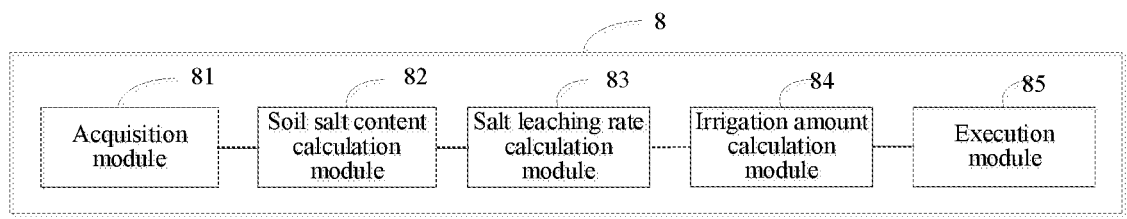
FIG. 8 is a schematic structural diagram of a crop irrigation apparatus based on a salt leaching fraction provided by an embodiment of the disclosure.

With reference to FIG. 8, FIG. 8 is a schematic structural diagram of a crop irrigation apparatus based on a salt leaching fraction provided by an embodiment of the disclosure. The apparatus may realize all or part of the crop irrigation method based on a salt leaching fraction through software, hardware or a combination of both. The apparatus 8 includes:

an acquisition module 81 configured for acquiring evaportranspiration and a leaf area index of crops in a target area, and rainfall in the target area;

a water demand calculation module 82 configured for acquiring a water demand of the crops in the target area according to the evaportranspiration and the leaf area index of the crops in the target area, and the rainfall in the target area;

an irrigation amount calculation module 83 configured for acquiring a salt leaching fraction of the crops in the target area, acquiring an irrigation amount of the crops in the target area according to the water demand of the crops in the target area, the salt leaching fraction and a calculating algorithm of the irrigation amount, generating a water storage instruction according to the irrigation amount of the crops in the target area, and sending the water storage instruction to an irrigation apparatus; and an execution module 84 configured for acquiring soil water content data corresponding to root range data of the crops according to the root range data of the crops, and controlling the irrigation apparatus to perform irrigation and drainage operations according to the soil water content data and preset water demand thresholds of all growth periods of the crops.

In the embodiment of the disclosure, through the acquisition module, the evaportranspiration and the leaf area index of the crops in the target area, and the rainfall in the target area are acquired; through the water demand calculation module, the water demand of the crops in the target area is acquired according to the evaportranspiration and the leaf area index of the crops in the target area, the rainfall in the target area and the calculating algorithm of the water demand; through the irrigation amount calculation module, the salt leaching fraction of the crops in the target area is acquired, the irrigation amount of the crops in the target area is acquired according to the water demand of the crops in the target area, the salt leaching fraction and the calculating algorithm of the irrigation amount, the water storage instruction is generated according to the irrigation amount of the crops in the target area, and the water storage instruction is sent to the irrigation apparatus; and through the execution module, the soil water content data corresponding to the root range data of the crops is acquired according to the root range data of the crops, and the irrigation apparatus is controlled to perform the irrigation and drainage operations according to the soil water content data and the preset water demand thresholds of all growth periods of the crops. The salt leaching fraction of the crops is calculated by combining a salt stress and effect of water quality on the irrigation amount of the crops, the irrigation apparatus is controlled to perform the irrigation and drainage operations by monitoring water and salt in a soil depth corresponding to crop roots, and excess salt is removed from the crop roots, thus reducing the salt stress on crop growth, ensuring a crop yield, and reducing waste of water resources while realizing efficient utilization of existing water resources.

Figure 9:
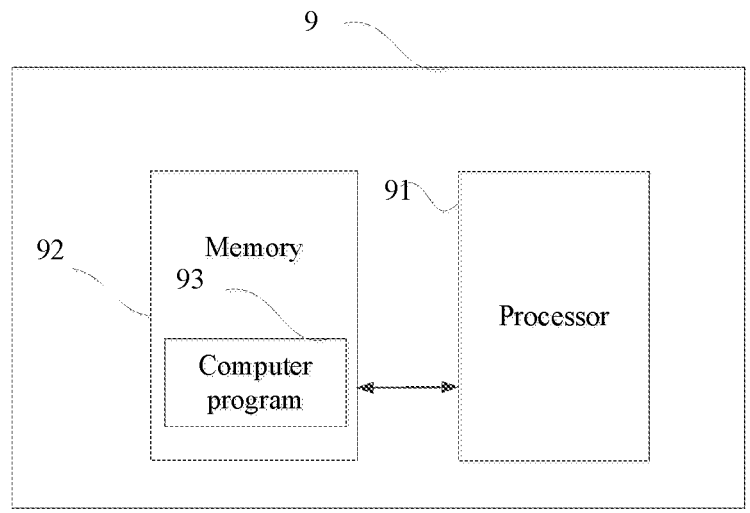
FIG. 9 is a schematic structural diagram of a computer device provided by an embodiment of the disclosure.

With reference to FIG. 9, FIG. 9 is a schematic structural diagram of a computer device provided by an embodiment of the disclosure. The computer device 9 includes a processor 91, a memory 92 and a computer program 93 stored on the memory 92 and running on the processor 91. The computer device may store a plurality of instructions suitable to be loaded by the processor 91 to execute the steps of the method in the above embodiments shown in FIG. 1 to FIG. 7. For the specific execution process, please refer to the specific description of the embodiments shown in FIG. 1 to FIG. 7, which will not be elaborated here.

The processor 91 may include one or more processing cores. The processor 91 uses various interfaces and lines to connect with various parts of a server, runs or executes instructions, programs, code sets or instruction sets stored in the memory 92, and calls data stored in the memory 92 to execute various functions of the crop irrigation apparatus 8 based on a salt leaching fraction and process data. Optionally, the processor 91 may be implemented in at least one hardware form of Digital Signal Processing (DSP), Field-Programmable Gate Array (FPGA) and Programmable Logic Array (PLA). The processor 91 may integrate one or a combination of several of a Central Processing Unit 91 (CPU), a Graphics Processing Unit 91 (GPU) and a modem. The CPU mainly deals with an operating system, a user interface, an application, and the like. The GPU is responsible for rendering and drawing a content to be displayed on a touch screen. The modem is configured to handle wireless communications. It may be understood that the above modem may not be integrated into the processor 91, but may be realized by a single chip.

The memory 92 may include a Random Access Memory 92 (RAM), and may also include a Read-Only Memory 92. Optionally, the memory 92 includes a non-transitory computer-readable storage medium. The memory 92 may be configured to store an instruction, a program, a code, a code set or an instruction set. The memory 92 may include a program storage area and a data storage area. The program storage area may store an instruction configured for realizing an operating system, an instruction configured for at least one function (e.g., a touch instruction), and an instruction for realizing each method embodiment above. The data storage area may store data involved in the above method embodiments. The memory 92 may optionally be at least one storage device disposed far from the forgoing processor 91.

The embodiment of the disclosure further provides a storage medium, where the storage medium may store a plurality of instructions suitable to be loaded by a processor to execute the steps of the method in the above embodiments shown in FIG. 1 to FIG. 7. For the specific execution process, please refer to the specific description of the embodiments shown in FIG. 1 to FIG. 7, which will not be elaborated here.

It can be clearly understood by those skilled in the art that for the convenience and conciseness of description, only the division of the above function units and modules is exemplified. In practical application, the above function allocation may be completed by different functional units and modules as required, that is, an internal structure of the apparatus is divided into different functional modules to complete all or part of the above-described functions. Each functional unit and module in the embodiments may be integrated in one processing unit, or each unit may exist alone physically, or two or more units may be integrated in one unit. The integrated units above may be implemented in the form of hardware, or in the form of software functional units. In addition, the specific names of the units and modules are only for convenience of distinguishing from each other, and are not configured to limit the scope of protection of the disclosure. The specific working processes of the units and modules in the system described above may refer to the corresponding processes in the aforementioned method embodiments, and will not be described in detail here.

In the above embodiments, the description of each of the embodiments has its own emphasis. For parts not detailed or recorded in certain embodiment, please refer to the related description of other embodiments.

Those of ordinary skills in the art may realize that the units and algorithm steps of each example described in combination with the embodiments disclosed herein can be implemented by electronic hardware, or a combination of computer software and electronic hardware. Whether these functions are executed by hardware or software depends on the specific application and design constraint algorithm of the technical solution. Professionals can use different methods to implement the described functions for each specific application, but such implementation should not be considered as being out of the scope of the disclosure.

In the embodiments provided by the disclosure, it should be understood that the disclosed apparatus/terminal device and method may be implemented in other ways. For example, the apparatus/terminal device embodiments described above are merely illustrative. For example, the division of the modules or units is only one logical function division. In practice, there may be other division methods. For another example, multiple units or components may be combined or integrated into another system, or some features may be ignored or not executed. In addition, the illustrated or discussed mutual coupling or direct coupling or communication connection may be indirect coupling or communication connection through some interfaces, apparatuses or units, and may be in electrical, mechanical or other forms.

The units illustrated as separation parts may either be or not physically separated, and the parts displayed as units may either be or not physical units, i.e., the parts displayed as units may be located in one place or distributed to multiple network units. Some or all of the units may be selected according to actual needs to achieve the objectives of the solutions in the embodiments. Some or all of the modules may be selected according to actual needs to achieve the objectives of the solutions in the embodiments.

In addition, each functional unit in each embodiment of the disclosure may be integrated in one processing unit, or each unit may exist alone physically, or two or more units may be integrated in one unit. The integrated units above may be implemented in the form of hardware, or in the form of software functional units.

The integrated modules/units, if being implemented in the form of a software functional unit and sold or configured as an independent product, may also be stored in a computer-readable storage medium. Based on such understanding, all or a part of the flow of the methods in the above embodiments of the disclosure may also be implemented by instructing relevant hardware through a computer program. The program may be stored in a not-volatile computer-readable storage medium. The computer program, when executed by the processor, may implement the steps of each method embodiment mentioned above. The computer program includes a computer program code, which may be in the form of a source code, an object code, an executable file or some intermediate form.

The disclosure is not limited to the above embodiments. If various modifications or variations of the disclosure do not depart from the gist and scope of the disclosure, and if these modifications and variations fall within the scope of the claims and the equivalent technologies of the disclosure, the disclosure is also intended to include these modifications and variations.

The invention claimed is:

1. A crop irrigation method based on a salt leaching fraction, comprising:
    acquiring information data of crops in a target area, wherein the information data comprises location information data, root range data and a salt tolerance threshold;
    acquiring a soil unsaturated hydraulic conductivity and a root water absorption rate of the crops in the target area, and acquiring a simulated soil water content in the target area according to the soil unsaturated hydraulic conductivity, the root water absorption rate, the location information data and a water movement algorithm in the numerical model of soil fluid, wherein the water movement algorithm is:

$$\frac{\partial \theta}{\partial t} = \frac{\partial}{\partial x}\left[K(h)\frac{\partial h}{\partial x}\right] + \frac{\partial}{\partial z}\left[K(th)\frac{\partial h}{\partial z}\right] - \frac{\partial K(h)}{\partial z} - S(h),$$

wherein $\theta$ is the soil water content, x is plane coordinate data in the location information data, z is longitudinal coordinate data in the location information data, K(h) is the soil unsaturated hydraulic conductivity, and S(h) is the root water absorption rate;
    acquiring a water flow rate in the target area, and acquiring the simulated soil salt content in the target area according to the simulated soil water content, the water flow rate, the location information data and a salt movement algorithm in the numerical model of soil fluid in the target area, wherein the salt movement algorithm is:

$$\frac{\partial(\theta EC_w)}{\partial t} = \frac{\partial}{\partial x}\left[\theta\lambda\left|\frac{q_w}{\theta}\right|\frac{\partial EC_w}{\partial x}\right] + \frac{\partial}{\partial z}\left[\theta\lambda\left|\frac{q_w}{\theta}\right|\frac{\partial EC_w}{\partial x}\right] - \frac{\partial}{\partial z}(q_w EC_w),$$

wherein $EC_w$ is the electricity conductivity of soil water, t is a water flow time, $\lambda$ is a preset water flow dispersity, and g is the water flow rate;
    acquiring a salt leaching fraction of the crops in the target area according to the salt tolerance threshold of the crops, the simulated soil salt content and a calculating algorithm of the salt leaching fraction;
    acquiring a water demand of the crops in the target area, acquiring an irrigation amount of the crops in the target area according to the water demand of the crops in the target area, the salt leaching fraction and a calculating algorithm of the irrigation amount, generating a water storage instruction according to the irrigation amount of the crops in the target area, and sending the water storage instruction to an irrigation apparatus; and acquiring a real soil water content and a real soil salt content associated with the root range data of the crops, and controlling the irrigation apparatus to perform irrigation and drainage operations according to the real soil water content, the real soil salt content and preset demand thresholds of all growth periods of the crops, wherein the demand thresholds comprise a water demand threshold and a salt demand threshold.

2. The crop irrigation method based on a salt leaching fraction according to claim 1, wherein acquiring a soil unsaturated hydraulic conductivity and a root water absorption rate of the crops in the target area comprises:

acquiring a soil pressure head in the target area, and acquiring a soil water content saturation in the target area according to the soil pressure head and a calculating algorithm of the soil water content saturation, wherein the calculating algorithm of the soil water content saturation is:

$$S_e = \frac{1}{[1+(-a|h|)^n]^m},$$

wherein $S_e$ is the effective saturation, $\alpha$, n and m are first, second and third empirical values related to the soil porosity respectively; and acquiring a soil saturated hydraulic conductivity in the target area, and acquiring the soil unsaturated hydraulic conductivity in the target area according to the soil saturated hydraulic conductivity, the soil water content saturation and a calculating algorithm of the soil unsaturated hydraulic conductivity, wherein the calculating algorithm of the soil unsaturated hydraulic conductivity is:

$$K(h) = K_s S_e^{0.5}[1-(1-S_e^{1/m})^m]^2,$$

wherein $K(h)$ is the soil unsaturated hydraulic conductivity, and $K_s$ is the soil saturated hydraulic conductivity in the target area.

3. The crop irrigation method based on a salt leaching fraction according to claim 1, wherein acquiring a soil unsaturated hydraulic conductivity and a root water absorption rate of the crops in the target area comprises:

constructing a root distribution equation of the crops in the target area according to the location information data and the root range data, wherein the root distribution equation is:

$$b(x,z) = \left(1 - \frac{z}{Z_m}\right)\left(1 - \frac{x}{X_m}\right)e^{-[(p_z/Z_m)|z^*-z|+(p_x/X_m)|x^*-x|]},$$

wherein $b(x, z)$ is the function describing root distribution with depth, $Z_m$ is the maximum rooting depth of the crops in the target area, $X_m$ is maximum root radius data of the crops in the target area, $p_z$ and $z^*$ are first and second empirical values associated with the maximum rooting depth respectively, and $p_x$ and $x^*$ are first and second empirical values associated with the maximum root radius data respectively;

acquiring a potential transpiration rate of the crops in the target area, inputting the potential transpiration rate into a preset calculating algorithm of a potential root water uptake in combination with the root distribution equation, and acquiring the potential root water uptake of the crops in the target area, wherein the calculating algorithm of the potential root water uptake is:

$$S_p(x,z) = \frac{X_m b(x,z) T_p}{\int_0^{X_m} \int_0^{Z_m} b(x,z) dx dz},$$

wherein $S_p(x, z)$ is the potential root water uptake, and $T_p$ is the potential transpiration rate; and acquiring a root water absorption rate of the crops in the target area according to the potential root water uptake of the crops in the target area and a calculating algorithm of the root water absorption rate, wherein the calculating algorithm of the root water absorption rate is:

$$S(h) = \beta(h) S_p,$$

wherein $\beta(h)$ is a water stress response function that is a prescribed dimensionless function of the soil water pressure head ($0 < \beta < 1$).

4. The crop irrigation method based on a salt leaching fraction according to claim 2, wherein acquiring a potential transpiration rate of the crops in the target area comprise:

acquiring an external radiation parameter of the target area, and acquiring evapotranspiration of the crops in the target area according to the external radiation parameter of the target area, a preset latent heat of vaporization and a calculating algorithm of the evapotranspiration, wherein the calculating algorithm of the evapotranspiration is:

$$ET_o = \frac{Kt RG_o}{\lambda},$$

wherein $ET_o$ is the evapotranspiration, Kt is empirical data of the evapotranspiration, $RG_o$ is the external radiation parameter of the target area, and $\lambda$ is the latent heat of vaporization; and acquiring a leaf area index of the crops in the target area, and acquiring a potential transpiration rate of the crops in the target area according to the evapotranspiration of the crops in the target area, the leaf area index and a preset calculating algorithm of the potential transpiration rate, wherein the calculating algorithm of the potential transpiration rate is:

$$T_p = ET_o(1 - e^{-KLAI}),$$

wherein $T_p$ is the potential transpiration rate, LAI is the leaf area index, and k is a constant governing the radiation extinction by the canopy as a function of sun angle, the distribution of plants, and the arrangement of leaves.

5. The crop irrigation method based on a salt leaching fraction according to claim 1, wherein acquiring an irrigation amount of the crops in the target area according to the water demand of the crops in the target area, the salt leaching fraction and a calculating algorithm of the irrigation amount comprises:

acquiring a first irrigation amount of the crops in the target area according to the water demand of the crops in the target area, the salt leaching fraction and a calculating algorithm of the first irrigation amount, wherein the calculating algorithm of the first irrigation amount is:

$$IR(t) = CWR \times (1 + LF(t)),$$

wherein IR(t) is the first irrigation amount, and LF(t) is the salt leaching fraction.

6. The crop irrigation method based on a salt leaching fraction according to claim 5, wherein acquiring an irrigation amount of the crops in the target area according to the water demand of the crops in the target area, the salt leaching fraction and a calculating algorithm of the irrigation amount further comprises:
acquiring irrigation efficiency of the irrigation apparatus and an irrigation water distribution uniformity, and acquiring a second irrigation amount of the crops in the target area according to the first irrigation amount of the crops in the target area, the irrigation efficiency of the irrigation apparatus, the irrigation water distribution uniformity, and a calculating algorithm of the second irrigation amount, wherein the calculating algorithm of the second irrigation amount is:

$$IWC = \frac{IR(t) \times (1 + Kl)}{Ki},$$

wherein IWC is the second irrigation amount, Ki is the irrigation efficiency, and Kl is the irrigation water distribution uniformity.

7. A computer device, comprising a processor, a memory storing a computer program which, when executed by the processor, causes the processor to perform a crop irrigation method based on a salt leaching fraction comprising:
acquiring information data of crops in a target area, wherein the information data comprises location information data, root range data and a salt tolerance threshold;
acquiring a soil unsaturated hydraulic conductivity and a root water absorption rate of the crops in the target area, and acquiring a simulated soil water content in the target area according to the soil unsaturated hydraulic conductivity, the root water absorption rate, the location information data and a water movement algorithm in the numerical model of soil fluid, wherein the water movement algorithm is:

$$\frac{\partial \theta}{\partial t} = \frac{\partial}{\partial x}\left[K(h)\frac{\partial h}{\partial x}\right] + \frac{\partial}{\partial z}\left[K(h)\frac{\partial h}{\partial z}\right] - \frac{\partial K(h)}{\partial z} - S(h),$$

wherein θ is the soil water content, x is plane coordinate data in the location information data, z is longitudinal coordinate data in the location information data, K(h) is the soil unsaturated hydraulic conductivity, and S(h) is the root water absorption rate;
acquiring a water flow rate in the target area, and acquiring the simulated soil salt content in the target area according to the simulated soil water content, the water flow rate, the location information data and a salt movement algorithm in the numerical model of soil fluid in the target area, wherein the salt movement algorithm is:

$$\frac{\partial(\theta EC_w)}{\partial t} = \frac{\partial}{\partial x}\left[\theta\lambda\left|\frac{q_w}{\theta}\right|\frac{\partial EC_w}{\partial x}\right] + \frac{\partial}{\partial sz}\left[\theta\lambda\left|\frac{q_w}{\theta}\right|\frac{\partial EC_w}{\partial z}\right] - \frac{\partial}{\partial z}(q_w EC_w),$$

wherein $EC_w$ is the electricity conductivity of soil water, t is a water flow time, λ is a preset water flow dispersity, and $q_w$ is the water flow rate;
acquiring a salt leaching fraction of the crops in the target area according to the salt tolerance threshold of the crops, the simulated soil salt content and a calculating algorithm of the salt leaching fraction;
acquiring a water demand of the crops in the target area, acquiring an irrigation amount of the crops in the target area according to the water demand of the crops in the target area, the salt leaching fraction and a calculating algorithm of the irrigation amount, generating a water storage instruction according to the irrigation amount of the crops in the target area, and sending the water storage instruction to an irrigation apparatus; and
acquiring a real soil water content and a real soil salt content associated with the root range data of the crops, and controlling the irrigation apparatus to perform irrigation and drainage operations according to the real soil water content, the real soil salt content and preset demand thresholds of all growth periods of the crops, wherein the demand thresholds comprise a water demand threshold and a salt demand threshold.

8. The computer device according to claim 7, wherein acquiring a soil unsaturated hydraulic conductivity and a root water absorption rate of the crops in the target area comprises:
acquiring a soil pressure head in the target area, and acquiring a soil water content saturation in the target area according to the soil pressure head and a calculating algorithm of the soil water content saturation, wherein the calculating algorithm of the soil water content saturation is:

$$S_e = \frac{1}{[1 + (-\alpha|h|)^n]^m},$$

wherein $S_e$ is the effective saturation, α, n and m are first, second and third empirical values related to the soil porosity respectively; and
acquiring a soil saturated hydraulic conductivity in the target area, and acquiring the soil unsaturated hydraulic conductivity in the target area according to the soil saturated hydraulic conductivity, the soil water content saturation and a calculating algorithm of the soil unsaturated hydraulic conductivity, wherein the calculating algorithm of the soil unsaturated hydraulic conductivity is:

$$K(h) = K_s S_e^{0.5}[1-(1-S_e^{1/m})^m]^2,$$

wherein K(h) is the soil unsaturated hydraulic conductivity, and $K_s$ is the soil saturated hydraulic conductivity in the target area.

9. The computer device according to claim 7, wherein acquiring a soil unsaturated hydraulic conductivity and a root water absorption rate of the crops in the target area comprises:
constructing a root distribution equation of the crops in the target area according to the location information data and the root range data, wherein the root distribution equation is:

$$b(x, z) = \left(1 - \frac{z}{Z_m}\right)\left(1 - \frac{x}{X_m}\right)e^{-[(p_z/Z_m)|z^*-z|+(p_x/X_m)|x^*-x|]},$$

wherein b(x, z) is the function describing the root distribution with depth, $Z_m$ is the maximum rooting depth of the crops in the target area, $X_m$ is maximum root radius data of the crops in the target area, $p_z$ and z* are first and second empirical values associated with the maximum rooting depth respectively, $p_x$ and x* are first and second empirical values associated with the maximum root radius data respectively;

acquiring a potential transpiration rate of the crops in the target area, inputting the potential transpiration rate into a preset calculating algorithm of a potential root water uptake in combination with the root distribution equation, and acquiring the potential root water uptake of the crops in the target area, wherein the calculating algorithm of the potential root water uptake is:

$$S_p(x, z) = \frac{X_m b(x, z) T_p}{\int_0^{X_m} \int_0^{Z_m} b(x, z) dx dz},$$

wherein $S_p(x, z)$ is the potential root water uptake, and $T_p$ is the potential transpiration rate; and acquiring a root water absorption rate of the crops in the target area according to the potential root water uptake of the crops in the target area and a calculating algorithm of the root water absorption rate, wherein the calculating algorithm of the root water absorption rate is:

$S(h)=\beta(h)S_p$,

Wherein $\beta(h)$ is a water stress response function that is a prescribed dimensionless function of the soil water pressure head ($0<\beta<1$).

10. The computer device according to claim 8, wherein acquiring a potential transpiration rate of the crops in the target area comprise:

acquiring an external radiation parameter of the target area, and acquiring evapotranspiration of the crops in the target area according to the external radiation parameter of the target area, a preset latent heat of vaporization and a calculating algorithm of the evapotranspiration, wherein the calculating algorithm of the evapotranspiration is:

$$ET_o = \frac{KtRG_o}{\lambda},$$

wherein $ET_o$ is the evapotranspiration, Kt is empirical data of the evapotranspiration, $RG_o$ is the external radiation parameter of the target area, and $\lambda$ is the latent heat of vaporization; and acquiring a leaf area index of the crops in the target area, and acquiring a potential transpiration rate of the crops in the target area according to the evapotranspiration of the crops in the target area, the leaf area index and a preset calculating algorithm of the potential transpiration rate, wherein the calculating algorithm of the potential transpiration rate is:

$T_p=ET_o(1-e^{-KLAI})$, wherein $T_p$ is the potential transpiration rate, LAI is the leaf area index, and k is a constant governing the radiation extinction by the canopy as a function of sun angle, the distribution of plants, and the arrangement of leaves.

11. The computer device according to claim 7, wherein acquiring an irrigation amount of the crops in the target area according to the water demand of the crops in the target area, the salt leaching fraction and a calculating algorithm of the irrigation amount comprises:

acquiring a first irrigation amount of the crops in the target area according to the water demand of the crops in the target area, the salt leaching fraction and a calculating algorithm of the first irrigation amount, wherein the calculating algorithm of the first irrigation amount is:

$IR(t)=CWR\times(1+LF(t))$, wherein IR(t) is the first irrigation amount, and LF(t) is the salt leaching fraction.

12. The computer device according to claim 11, wherein acquiring an irrigation amount of the crops in the target area according to the water demand of the crops in the target area, the salt leaching fraction and a calculating algorithm of the irrigation amount further comprises:

acquiring irrigation efficiency of the irrigation apparatus and an irrigation water distribution uniformity, and acquiring a second irrigation amount of the crops in the target area according to the first irrigation amount of the crops in the target area, the irrigation efficiency of the irrigation apparatus, the irrigation water distribution uniformity, and a calculating algorithm of the second irrigation amount, wherein the calculating algorithm of the second irrigation amount is:

$$IWC = \frac{IR(t) \times (1 + Kl)}{Ki},$$

wherein IWC is the second irrigation amount, Ki is the irrigation efficiency, and Kl is the irrigation water distribution uniformity.

13. A non-transitory storage medium storing a computer program which, when executed by a processor, causes the processor to perform a crop irrigation method based on a salt leaching fraction comprising:

acquiring information data of crops in a target area, wherein the information data comprises location information data, root range data and a salt tolerance threshold;

acquiring a soil unsaturated hydraulic conductivity and a root water absorption rate of the crops in the target area, and acquiring a simulated soil water content in the target area according to the soil unsaturated hydraulic conductivity, the root water absorption rate, the location information data and a water movement algorithm in the numerical model of soil fluid, wherein the water movement algorithm is:

$$\frac{\partial \theta}{\partial t} = \frac{\partial}{\partial x}\left[K(h)\frac{\partial h}{\partial x}\right] + \frac{\partial}{\partial z}\left[K(h)\frac{\partial h}{\partial z}\right] - \frac{\partial K(h)}{\partial z} - S(h),$$

wherein $\theta$ is the soil water content, x is plane coordinate data in the location information data, z is longitudinal coordinate data in the location information data, K(h) is the soil unsaturated hydraulic conductivity, and S(h) is the root water absorption rate;

acquiring a water flow rate in the target area, and acquiring the simulated soil salt content in the target area according to the simulated soil water content, the water flow rate, the location information data and a salt movement algorithm in the numerical model of soil fluid in the target area, wherein the salt movement algorithm is:

$$\frac{\partial(\theta EC_w)}{\partial t} = \frac{\partial}{\partial x}\left[\theta\lambda\left|\frac{q_w}{\theta}\right|\frac{\partial EC_w}{\partial x}\right] + \frac{\partial}{\partial sz}\left[\theta\lambda\left|\frac{q_w}{\theta}\right|\frac{\partial EC_w}{\partial z}\right] - \frac{\partial}{\partial z}(q_w EC_w),$$

wherein $EC_w$ is the electricity conductivity of soil water, t is a water flow time, $\lambda$ is a preset water flow dispersity, and $q_w$ is the water flow rate;

acquiring a salt leaching fraction of the crops in the target area according to the salt tolerance threshold of the crops, the simulated soil salt content and a calculating algorithm of the salt leaching fraction;

acquiring a water demand of the crops in the target area, acquiring an irrigation amount of the crops in the target area according to the water demand of the crops in the target area, the salt leaching fraction and a calculating algorithm of the irrigation amount, generating a water storage instruction according to the irrigation amount of the crops in the target area, and sending the water storage instruction to an irrigation apparatus; and acquiring a real soil water content and a real soil salt content associated with the root range data of the crops, and controlling the irrigation apparatus to perform irrigation and drainage operations according to the real soil water content, the real soil salt content and preset demand thresholds of all growth periods of the crops, wherein the demand thresholds comprise a water demand threshold and a salt demand threshold.

14. The non-transitory storage medium according to claim 13, wherein acquiring a soil unsaturated hydraulic conductivity and a root water absorption rate of the crops in the target area comprises:

acquiring a soil pressure head in the target area, and acquiring a soil water content saturation in the target area according to the soil pressure head and a calculating algorithm of the soil water content saturation, wherein the calculating algorithm of the soil water content saturation is:

$$S_e = \frac{1}{[1+(-\alpha|h|)^n]^m},$$

wherein $S_e$ is the effective saturation, $\alpha$, n and m are first, second and third empirical values related to the soil porosity respectively; and acquiring a soil saturated hydraulic conductivity in the target area, and acquiring the soil unsaturated hydraulic conductivity in the target area according to the soil saturated hydraulic conductivity, the soil water content saturation and a calculating algorithm of the soil unsaturated hydraulic conductivity, wherein the calculating algorithm of the soil unsaturated hydraulic conductivity is:

$$K(h)=K_s S_e^{0.5}[1-(1-S_e^{1/m})^m]^2,$$

wherein K(h) is the soil unsaturated hydraulic conductivity, and $K_s$ is the soil saturated hydraulic conductivity in the target area.

15. The non-transitory storage medium according to claim 13, wherein acquiring a soil unsaturated hydraulic conductivity and a root water absorption rate of the crops in the target area comprises:

constructing a root distribution equation of the crops in the target area according to the location information data and the root range data, wherein the root distribution equation is:

$$b(x,z) = \left(1-\frac{z}{Z_m}\right)\left(1-\frac{x}{X_m}\right)e^{-[(p_z/Z_m)|z^*-z|+(p_x/X_m)|x^*-x|]},$$

wherein b(x, z) is the function describing the root distribution with depth, $Z_m$ is maximum rooting depth data of the crops in the target area, $X_m$ is the maximum root radius data of the crops in the target area, $p_z$ and $z^*$ are first and second empirical values associated with the maximum rooting depth respectively, $p_x$ and $x^*$ are first and second empirical values associated with the maximum root radius data respectively, and $p_z$ and $z^*$ are first and second empirical values associated with the maximum rooting depth respectively;

acquiring a potential transpiration rate of the crops in the target area, inputting the potential transpiration rate into a preset calculating algorithm of a potential root water uptake in combination with the root distribution equation, and acquiring the potential root water uptake of the crops in the target area, wherein the calculating algorithm of the potential root water uptake is:

$$S_p(x,z) = \frac{X_m b(x,z) T_p}{\int_0^{X_m}\int_0^{Z_m} b(x,z)dxdz},$$

wherein $S_p(x, z)$ is the potential root water uptake, and $T_p$ is the potential transpiration rate; and acquiring a root water absorption rate of the crops in the target area according to the potential root water uptake of the crops in the target area and a calculating algorithm of the root water absorption rate, wherein the calculating algorithm of the root water absorption rate is:

$$S(h)=\beta(h)S_p,$$

Wherein $\beta(h)$ is a water stress response function that is a prescribed dimensionless function of the soil water pressure head (0<$\beta$<1).

16. The non-transitory storage medium according to claim 14, wherein acquiring a potential transpiration rate of the crops in the target area comprise:

acquiring an external radiation parameter of the target area, and acquiring evapotranspiration of the crops in the target area according to the external radiation parameter of the target area, a preset latent heat of vaporization and a calculating algorithm of the evapotranspiration, wherein the calculating algorithm of the evapotranspiration is:

$$ET_o = \frac{KtRG_o}{\lambda},$$

wherein $ET_o$ is the evapotranspiration, Kt is empirical data of the evapotranspiration, $RG_o$ is the external radiation parameter of the target area, and $\lambda$ is the latent heat of vaporization; and acquiring a leaf area index of the crops in the target area, and acquiring a potential transpiration rate of the crops in the target area according to the evapotranspiration of the crops in the target area, the leaf area index and a preset calculating algorithm of the potential transpiration rate, wherein the calculating algorithm of the potential transpiration rate is:

$$T_p = ET_o(1-e^{-KLAI}),$$

wherein $T_p$ is the potential transpiration rate, LAI is the leaf area index, and k is a constant governing the radiation extinction by the canopy as a function of sun angle, the distribution of plants, and the arrangement of leaves.

17. The non-transitory storage medium according to claim 13, wherein acquiring an irrigation amount of the crops in the target area according to the water demand of the crops in the target area, the salt leaching fraction and a calculating algorithm of the irrigation amount comprises:

acquiring a first irrigation amount of the crops in the target area according to the water demand of the crops in the target area, the salt leaching fraction and a calculating algorithm of the first irrigation amount, wherein the calculating algorithm of the first irrigation amount is:

$$IR(t) = CWR \times (1 + LF(t)),$$

wherein IR(t) is the first irrigation amount, and LF(t) is the salt leaching fraction.

* * * * *